(12) United States Patent
Okuno

(10) Patent No.: US 11,463,638 B2
(45) Date of Patent: Oct. 4, 2022

(54) STREAKING CORRECTION CIRCUIT, IMAGING APPARATUS, AND ELECTRONIC EQUIPMENT

(71) Applicant: SONY SEMICONDUCTOR SOLUTIONS CORPORATION, Kanagawa (JP)

(72) Inventor: Kenichi Okuno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,402

(22) PCT Filed: Jul. 16, 2019

(86) PCT No.: PCT/JP2019/027891
§ 371 (c)(1),
(2) Date: Jan. 18, 2021

(87) PCT Pub. No.: WO2020/022120
PCT Pub. Date: Jan. 30, 2020

(65) Prior Publication Data
US 2021/0321051 A1    Oct. 14, 2021

(30) Foreign Application Priority Data

Jul. 27, 2018    (JP) .............................. JP2018-141166

(51) Int. Cl.
*H04N 5/365*    (2011.01)
*H04N 5/374*    (2011.01)

(52) U.S. Cl.
CPC ......... *H04N 5/3655* (2013.01); *H04N 5/3658* (2013.01); *H04N 5/374* (2013.01)

(58) Field of Classification Search
CPC ...... H04N 5/357; H04N 5/3577; H04N 5/359; H04N 5/3595; H04N 5/361; H04N 5/365;
(Continued)

(56) References Cited

U.S. PATENT DOCUMENTS

2007/0165120 A1* 7/2007 Takane ................. H04N 5/2351
                                                              348/248
2010/0128150 A1    5/2010 Taguchi
(Continued)

FOREIGN PATENT DOCUMENTS

JP    2005-130331 A    5/2005
JP    2005130331    *    5/2005
(Continued)

OTHER PUBLICATIONS

International Search Report and Written Opinion of PCT Application No. PCT/JP2019/027891, dated Sep. 24, 2019, 09 pages of ISRWO.

*Primary Examiner* — Paul M Berardesca
(74) *Attorney, Agent, or Firm* — Chip Law Group

(57) ABSTRACT

A streaking correction circuit of the present disclosure includes a correction signal generation section and a correction process section. The correction signal generation section generates a correction signal on the basis of signals of light-shielded pixels of light-shielded portions provided at edge portions of a pixel array section having pixels, each including a light reception section, arranged in a matrix pattern. The correction process section performs a correction process on signals of effective pixels of the pixel array section by using the correction signal generated by the correction signal generation section. Then, the correction signal generation section divides a captured image into a plurality of regions relative to a position of a singular point in the captured image and generates a correction signal for each divided region by using signals of the light-shielded (Continued)

pixels. The correction process section performs the correction process by using the correction signal generated for each divided region.

10 Claims, 15 Drawing Sheets

(58) Field of Classification Search
CPC .. H04N 5/3655; H04N 5/3651; H04N 5/3656; H04N 5/3658; H04N 5/36963; H04N 5/378

See application file for complete search history.

(56) References Cited

U.S. PATENT DOCUMENTS

| | | |
|---|---|---|
| 2015/0109490 A1 | 4/2015 | Kanemitsu et al. |
| 2017/0126999 A1* | 5/2017 | Elikhis ................ H04N 5/3658 |
| 2017/0272671 A1* | 9/2017 | Sakaguchi ............ H04N 5/361 |

FOREIGN PATENT DOCUMENTS

| | | |
|---|---|---|
| JP | 2008-236271 A | 10/2008 |
| JP | 2010-056874 A | 3/2010 |
| JP | 2011-120111 A | 6/2011 |
| JP | 2014-030274 A | 2/2014 |
| JP | 2015-082732 A | 4/2015 |
| JP | 2016-119592 A | 6/2016 |

\* cited by examiner

STREAKING CORRECTION CIRCUIT, IMAGING APPARATUS, AND ELECTRONIC EQUIPMENT

CROSS REFERENCE TO RELATED APPLICATIONS

This application is a U.S. National Phase of International Patent Application No. PCT/JP2019/027891 filed on Jul. 16, 2019, which claims priority benefit of Japanese Patent Application No. JP 2018-141166 filed in the Japan Patent Office on Jul. 27, 2018. Each of the above-referenced applications is hereby incorporated herein by reference in its entirety.

TECHNICAL FIELD

The present disclosure relates to a streaking correction circuit, an imaging apparatus, and electronic equipment.

BACKGROUND ART

An imaging apparatus may develop stripe noise called streaking that appears horizontally (i.e., in a row direction of a matrix pixel layout) in a captured image due to a variety of factors. A streaking correction circuit is provided in a signal processing section of the imaging apparatus to suppress image quality deterioration attributable to this streaking.

It has been common for a streaking correction circuit to detect a black level or noise level from signals of light-shielded pixels of light-shielded portions provided at both horizontal edge portions of a pixel array section, calculate a correction value by averaging between left and right, linear interpolation, or the like on the basis of the detected level, and carry out correction by using the calculated correction value (refer, for example, to PTL 1).

CITATION LIST

Patent Literature

[PTL 1]
Japanese Patent Laid-open No. 2008-236271

SUMMARY

Technical Problems

The conventional technology described in the above PTL 1 attempts to find a correction value on the basis of a correction value found from signals of light-shielded pixels or a value calculated by an ε filter or a median filter, thus making it impossible to calculate a correction value exclusively for a certain region in an image capture screen. This may make it impossible to effectively suppress distinctive offset or noise in the captured image, thus resulting in incomplete correction.

In light of the foregoing, it is an object of the present disclosure to provide a streaking correction circuit capable of effectively suppressing distinctive offset or noise in an image capture screen, an imaging apparatus using the streaking correction circuit, and electronic equipment having the imaging apparatus.

Solution to Problems

A streaking correction circuit of the present disclosure for achieving the above object, including:

a correction signal generation section adapted to generate a correction signal on the basis of signals of light-shielded pixels of light-shielded portions provided at edge portions of a pixel array section having pixels, each including a light reception section, arranged in a matrix pattern; and a correction process section adapted to perform a correction process on signals of effective pixels of the pixel array section by using the correction signal generated by the correction signal generation section, in which the correction signal generation section divides a captured image into a plurality of regions relative to a position of a singular point in the captured image and generates a correction signal for each divided region by using the signals of the light-shielded pixels, and the correction process section performs the correction process by using the correction signal generated for each divided region.

An imaging apparatus of the present disclosure for achieving the above object is characterized in that the streaking correction circuit having the above configuration is used. Also, electronic equipment of the present disclosure for achieving the above object is characterized in that the electronic equipment has the imaging apparatus.

Advantageous Effect of Invention

According to the present disclosure, it is possible to effectively suppress distinctive offset or noise in an image capture screen. It should be noted that the advantageous effect described herein is not necessarily limited and may be any one of the advantageous effects described in the present disclosure. Also, the advantageous effects described in the present specification are merely illustrative and not restrictive, and there may be additional advantageous effects.

DESCRIPTION OF EMBODIMENT

Figure 1:
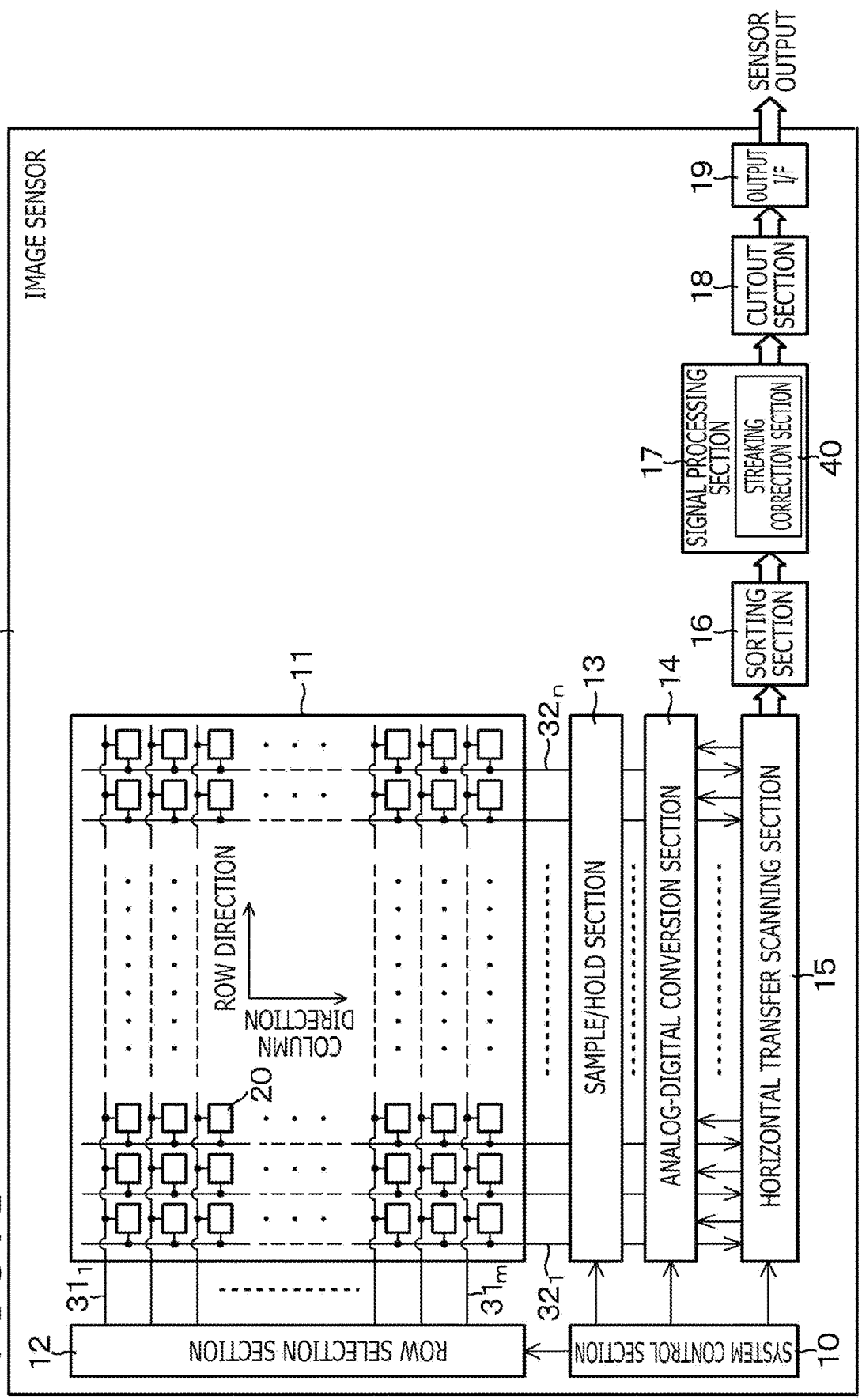
FIG. 1 is a block diagram schematically illustrating a basic configuration of a CMOS image sensor, an example of an imaging apparatus of the present disclosure.

A detailed description will be given below of a mode for carrying out the technique of the present disclosure (hereinafter, referred to as an "embodiment") with reference to drawings. The technique of the present disclosure is not limited to the embodiment. In the description given below, the same elements or elements having the same function will be denoted by the same reference sign, and a redundant description will be omitted. It should be noted that the description will be given in the following order:

1. Description, in general, of the streaking correction circuit, the imaging apparatus, and the electronic equipment of the present disclosure
2. Imaging apparatus of the present disclosure
2-1. Configuration example of the CMOS image sensor
2-2. Configuration example of the pixel
2-3. Chip structure
2-4. Streaking
3. Embodiment of the present disclosure
3-1. Working Example 1 (basic form of the streaking correction circuit)
3-2. Working Example 2 (specific configuration example of the region-by-region correction value calculation section)
4. Modification example
5. Application example
6. Electronic equipment of the present disclosure (example of the camera module)
7. Possible configurations of the present disclosure <Description, in General, of the Streaking Correction Circuit, the Imaging Apparatus, and the Electronic Equipment of the Present Disclosure>

In the streaking correction circuit, the imaging apparatus, and the electronic equipment of the present disclosure, a singular point in a captured image can be noise produced by a noise generation source. Then, a power line disposed in the pixel array section can be cited as an example of the noise generation source.

In the streaking correction circuit, the imaging apparatus, and the electronic equipment of the present disclosure including the above preferred configuration, the correction signal generation section can calculate, of light-shielded pixels of the light-shielded portions, an average value of light-shielded pixel data excluding defective pixel data with a luminance level in excess of a given threshold, thus generating a correction signal from the calculated average value. Also, the correction signal generation section can calculate an average value of light-shielded pixel data excluding defective pixel data by using a median filter.

Also, in the streaking correction circuit, the imaging apparatus, and the electronic equipment of the present disclosure including the above preferred configuration, the number of divided regions and a size of each region can be set in a desired manner at the time of division into a plurality of regions.

In the imaging apparatus of the present disclosure including the above preferred embodiment, the correction signal generation section can have a non-volatile memory to which a correction signal acquired in advance is written. Then, at the time of activation of the imaging apparatus, the correction signal generation section reads out the correction signal from the non-volatile memory for use in the correction process by the correction process section. The correction signal written to the non-volatile memory can be derived from an evaluation measurement result prior to shipment of the imaging apparatus.

<Imaging Apparatus of the Present Disclosure>

A description will be given of a basic configuration of the imaging apparatus to which the technique of the present disclosure is applied. The description will be given by citing, as an example, a CMOS (Complementary Metal Oxide Semiconductor) image sensor, a type of X-Y address imaging apparatus, as an imaging apparatus. A CMOS image sensor is manufactured by using a CMOS process or part thereof.

[Configuration Example of the CMOS Image Sensor]

FIG. 1 is a block diagram schematically illustrating a basic configuration of the CMOS image sensor, an example of the imaging apparatus of the present disclosure.

A CMOS image sensor 1 according to the present example has a pixel array section 11 and a peripheral circuit section of the pixel array section 11. The pixel array section 11 has pixels 20, each including a light reception element (photoelectric conversion section), arranged two-dimensionally in row and column directions, namely, in a matrix form. Here, the row direction refers to the direction in which the pixels 20 are disposed in rows, i.e., the direction along the pixel rows (what is called a horizontal direction). Also, the column direction refers to the direction in which the pixels 20 are disposed in columns, i.e., the direction along the pixel columns (what is called a vertical direction). The pixels 20 generate, through photoelectric conversion, photocharge whose amount of charge corresponds to an amount of light received and store the photocharge.

The peripheral circuit section of the pixel array section 11 includes, for example, a row selection section 12, a sample/hold section 13, an analog-digital conversion section 14, a horizontal transfer scanning section 15, a sorting section 16, a signal processing section 17, a cutout section 18, an output I/F (interface) section 19, and the like.

In the pixel array section 11, pixel drive lines $31_1$ to $31_m$ (hereinafter may be collectively written as "pixel drive lines 31") are disposed, one for each pixel row, along the row direction for the pixel layout in a matrix form. Also, vertical signal lines $32_1$ to $32_n$ (hereinafter may be collectively written as "vertical signal lines 32") are disposed, one for each pixel column, along the column direction. The pixel drive line 31 transfers a drive signal used to drive the pixels 20 so as to read out a signal from the pixel 20. Although FIG. 1 depicts the pixel drive line 31 as a single piece of wiring, the pixel drive line 31 is not limited to a single piece of wiring. The pixel drive line 31 has its one end connected to an output end corresponding to one of rows of the row selection section 12.

A description will be given below of each circuit section of the peripheral circuit section of the pixel array section 11, i.e., the row selection section 12, the sample/hold section 13, the analog-digital conversion section 14, the horizontal transfer scanning section 15, the sorting section 16, the signal processing section 17, the cutout section 18, and the output I/F (interface) section 19.

The row selection section 12 includes shift registers, address decoders, and the like and controls pixel row scanning and pixel row addresses at the time of selection of each of the pixels 20 of the pixel array section 11. Although a specific configuration thereof is omitted, the row selection section 12 generally includes two scan units, namely, a read scan unit and a sweep scan unit.

The read scan unit selectively scans the pixels 20 of the pixel array section 11 in sequence on a row-by-row basis. Pixel signals read out from the pixels 20 are analog signals. The sweep scan unit performs a sweep scan on the rows of pixels to be read subject to a read scan by the read scan unit a shutter speed's worth of time ahead of the read scan.

The sweep scan by this sweep scan unit sweeps out unnecessary charge from the photoelectric conversion sections of the pixels 20 in the row to be read, thus resetting the photoelectric conversion sections. Then, what is called an electronic shutter action is performed by the sweeping-out of unnecessary charge (resetting) by this sweep scan unit. Here, the electronic shutter action refers to an action of discarding photocharge of the photoelectric conversion section and initiating exposure anew (initiate accumulation of photocharge).

The sample/hold section 13 samples a pixel signal supplied via each of the vertical signal lines $32_1$ to $32_n$, holding the sampled signal (sampling and holding).

The analog-digital conversion section 14 includes a set of a plurality of analog-digital converters provided to correspond to the pixel columns of the pixel array section 11 such as those provided one for each pixel column. The analog-digital conversion section 14 is a column parallel analog-digital conversion section that converts analog pixel signals, output through the respective vertical signal lines $32_1$ to $32_n$ on a pixel-column-by-pixel-column basis, into digital signals.

The horizontal transfer scanning section 15 includes shift registers, address decoders, and the like and controls pixel column scanning and pixel column addresses at the time of readout of a signal from each of the pixels 20 of the pixel array section 11. Pixel data converted into digital signals by the analog-digital conversion section 14 is read out on a pixel-column-by-pixel-column basis under control of the horizontal transfer scanning section 15.

The sorting section 16 performs a process of sorting the pixel data, read out through the horizontal transfer scanning section 15, into an arrangement corresponding to the layout of the pixels 20 of the pixel array section 11.

The signal processing section 17 performs given signal processing on a digital signal supplied through a horizontal transfer line 18, thus generating two-dimensional image data. A noise removal process such as a CDS (Correlated Double Sampling) process can be cited as an example of given signal processing. The CDS process carries out a process of not only acquiring signals of a row's worth of pixels by capturing reset and signal levels from the pixels 20 of the selected row and taking the difference in level therebetween but also removing fixed pattern noise from the pixels 20.

The signal processing section 17 further has a streaking correction circuit 40 as a functional section for correcting streaking that occurs along the row direction (horizontally) in a captured image. The configuration and actions of the streaking correction circuit 40 will be described in detail later.

The cutout section 18 performs a process of cutting out, as necessary, a specific region of data of a captured image in captured image data that has gone through the signal processing section 17. The output I/F section 19 outputs captured image data that has passed through the cutout section 18 or image data cut out by the cutout section 18 to equipment external to the CMOS image sensor 1 as sensor output.

The respective circuit sections described above, namely, the row selection section 12, the sample/hold section 13, the analog-digital conversion section 14, the horizontal transfer scanning section 15, the sorting section 16, the signal processing section 17, and the cutout section 18 perform their respective functions described above under control of a system control section 10. The system control section 10 generates a variety of timing signals, clock signals, control signals, and the like, controlling driving of the respective circuit sections on the basis of these signals generated.

[Configuration Example of the Pixel Circuit]

Figure 2:
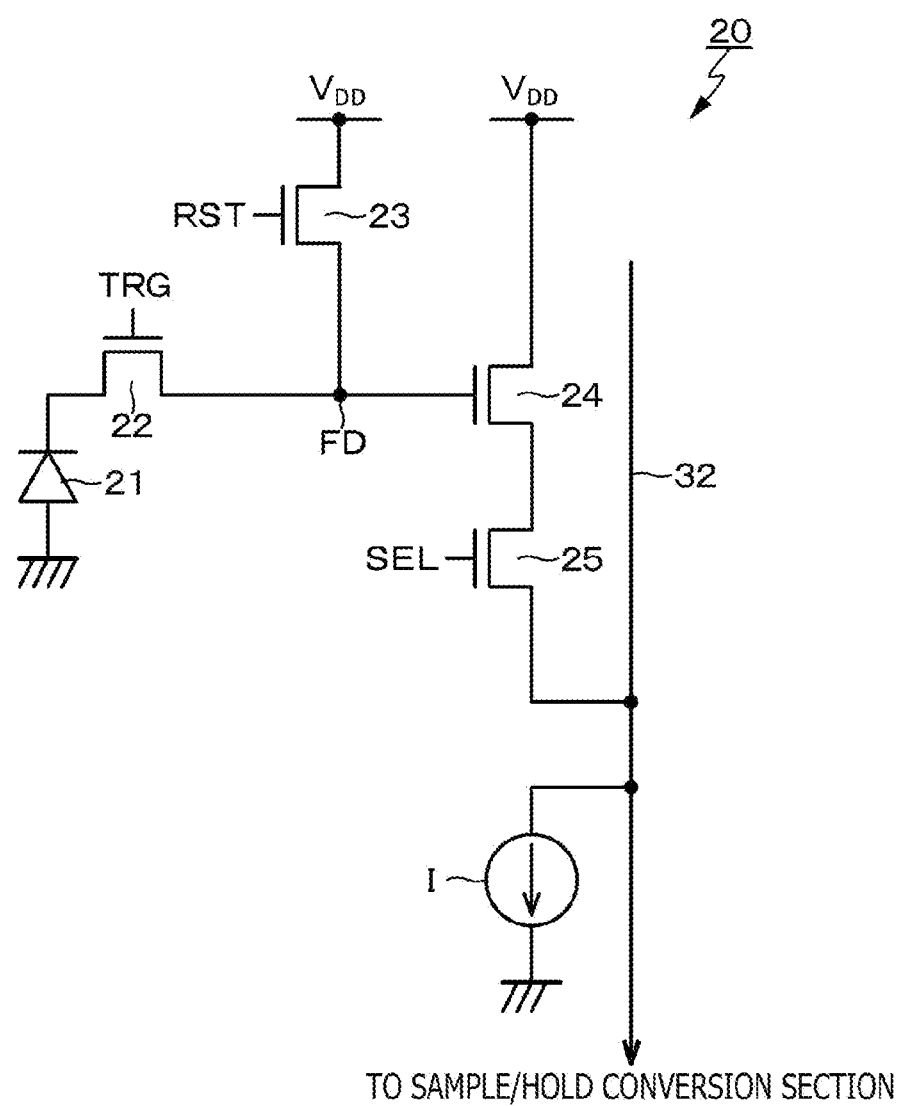
FIG. 2 is a circuit diagram illustrating an example of a configuration of a pixel circuit.

FIG. 2 is a circuit diagram illustrating an example of a circuit configuration of the pixel 20. The pixel 20 has, for example, a photodiode 21 as a light reception element (photoelectric conversion section). The pixel 20 includes a transfer transistor 22, a reset transistor 23, an amplifying transistor 24, and a selection transistor 25 in addition to the photodiode 21.

It should be noted that N-channel MOS field effect transistors (FETs) are, for example, used as the four transistors, or the transfer transistor 22, the reset transistor 23, the amplifying transistor 24, and the selection transistor 25. It should be noted, however, that the combination of conduction types of the four transistors 22 to 25 depicted here is merely an example and is not limited thereto.

A plurality of pixel drive lines is disposed for the pixels 20 as the pixel drive lines 31 described earlier, with each pixel drive line shared by the pixels 20 of the same pixel row. The plurality of these pixel drive lines is connected to output ends corresponding to the respective pixel rows of the row selection section 12 on a pixel-row-by-pixel-row basis. The row selection section 12 outputs a transfer signal TRG, a reset signal RST, and a selection signal SEL, to the plurality of pixel drive lines as appropriate.

The photodiode 21 has its anode electrode connected to a low-potential side power supply (e.g., ground), converting received light into photocharge (photoelectrons in this case) whose amount of charge is proportional to the amount of light received and storing the photocharge. The photodiode 21 has its cathode electrode electrically connected to a gate electrode of the amplifying transistor 24 via the transfer transistor 22. Here, a region where the gate electrode of the amplifying transistor 24 is electrically connected is a floating diffusion (impurity diffusion) FD. The floating diffusion FD is a charge-voltage conversion section that converts charge into a voltage.

The transfer signal TRG, a high-level (e.g., $V_{DD}$ level) active signal, is supplied to a gate electrode of the transfer transistor 22 from the row selection section 12. The transfer transistor 22 is brought into conduction in response to the transfer signal TRG, transferring photocharge, converted from light by the photodiode 21 and accumulated in the photodiode 21, to the floating diffusion FD.

The reset transistor 23 is connected between a node of the high-potential side supply voltage $V_{DD}$ and the floating diffusion FD. The reset signal RST, a high-level active signal, is supplied to a gate electrode of the reset transistor 23 from the row selection section 12. The reset transistor 23 is driven into conduction in response to the reset signal RST, resetting the floating diffusion FD by discarding the charge of the floating diffusion FD to the node of the voltage $V_{DD}$.

The amplifying transistor 24 has its gate electrode connected to the floating diffusion FD and its drain electrode connected to the node of the high-potential side supply voltage $V_{DD}$. The amplifying transistor 24 is an input section of a source follower for reading out a signal acquired through photoelectric conversion by the photodiode 21. That is, the amplifying transistor 24 has its source electrode connected to the vertical signal line 32 via the selection transistor 25. Then, the amplifying transistor 24 and a current source I, connected to one end of the vertical signal line 32, form a source follower for converting the voltage of the floating diffusion FD into the potential of the vertical signal line 32.

The selection transistor 25 has its drain electrode connected to the source electrode of the amplifying transistor 24 and its source electrode connected to the vertical signal line 32. The selection signal SEL, a high-level active signal, is supplied to a gate electrode of the selection transistor 25 from the row selection section 12. The transfer transistor 25 is brought into conduction in response to the selection signal SEL, transferring a signal output from the amplifying transistor 24 as a selection state of the pixel 20 to the vertical signal line 32.

It should be noted that the selection transistor 25 can also be connected between the node of the high-potential side supply voltage $V_{DD}$ and the drain electrode of the amplifying transistor 24. Also, in the present example, a four-transistor configuration having four transistors (Tr), namely, the transfer transistor 22, the reset transistor 23, the amplifying transistor 24, and the selection transistor 25, has been cited as an example of a circuit of the pixel 20, the pixel 20 is not limited thereto. For example, a three-Tr configuration with the selection transistor 25 removed and the amplifying transistor 24 having the function of the selection transistor 25 can also be used, and as necessary, a five-Tr configuration with an increased number of transistors can also be used.

[Chip Structure]

The CMOS image sensor described above has, as a chip structure, what is called a flat structure as is clear from FIG. 1. The flat structure is a chip structure in which the peripheral circuit section of the pixel array section 11, namely, the system control section 10, the row selection section 12, the sample/hold section 13, the analog-digital conversion section 14, the horizontal transfer scanning section 15, the sorting section 16, the signal processing section 17, the cutout section 18, and the output I/F section 19, are formed on the same semiconductor substrate (semiconductor chip) as the pixel array section 11.

The chip structure of the CMOS image sensor 1 is not limited to a flat structure, and what is called a laminated structure can also be used. A laminated structure is a chip structure in which the peripheral circuit section of the pixel array section 11 is formed on at least one semiconductor substrate different from the semiconductor substrate on which the pixel array section 11 is formed. According to this laminated structure, a first-layer semiconductor substrate needs only to be sized (have an area) enough to permit the formation of the pixel array section 11, thus providing a smaller first-layer semiconductor substrate, and by extension, a smaller chip size as a whole. Further, a process suitable for fabrication of the pixels 20 is applicable to the first-layer semiconductor substrate whereas a process suitable for fabrication of circuit portions is applicable to other semiconductor substrate, thus contributing to optimization of the processes for manufacture of the CMOS image sensor 1.

[Streaking]

Incidentally, the CMOS image sensor 1 may develop streaking, line noise in a captured image, due to a variety of factors. As an example, in the case where a high-luminance name subject is imaged, streaking occurs horizontally (in the row direction). Then, the occurrence of streaking leads to deteriorated (aggravated) image quality. The streaking correction circuit 40 is provided in the signal processing section 17 to suppress image quality deterioration attributable to streaking.

The streaking correction circuit 40 generally detects a black level or noise level from signals of light-shielded pixels of the light-shielded portions provided at both horizontal edge portions of the pixel array section 11, calculates a correction value by averaging between left and right, linear interpolation, or the like on the basis of this detected level, and corrects streaking by using the calculated correction value.

In this streaking correction, an attempt to find a correction value on the basis of a correction value found from the signals of the light-shielded pixels or a value calculated by an ϵ filter or a median filter makes it impossible to calculate a correction value exclusively for a certain region in the image capture screen. This may make it impossible to effectively suppress distinctive offset or noise in the captured image, thus resulting in incomplete correction.

Figure 3:
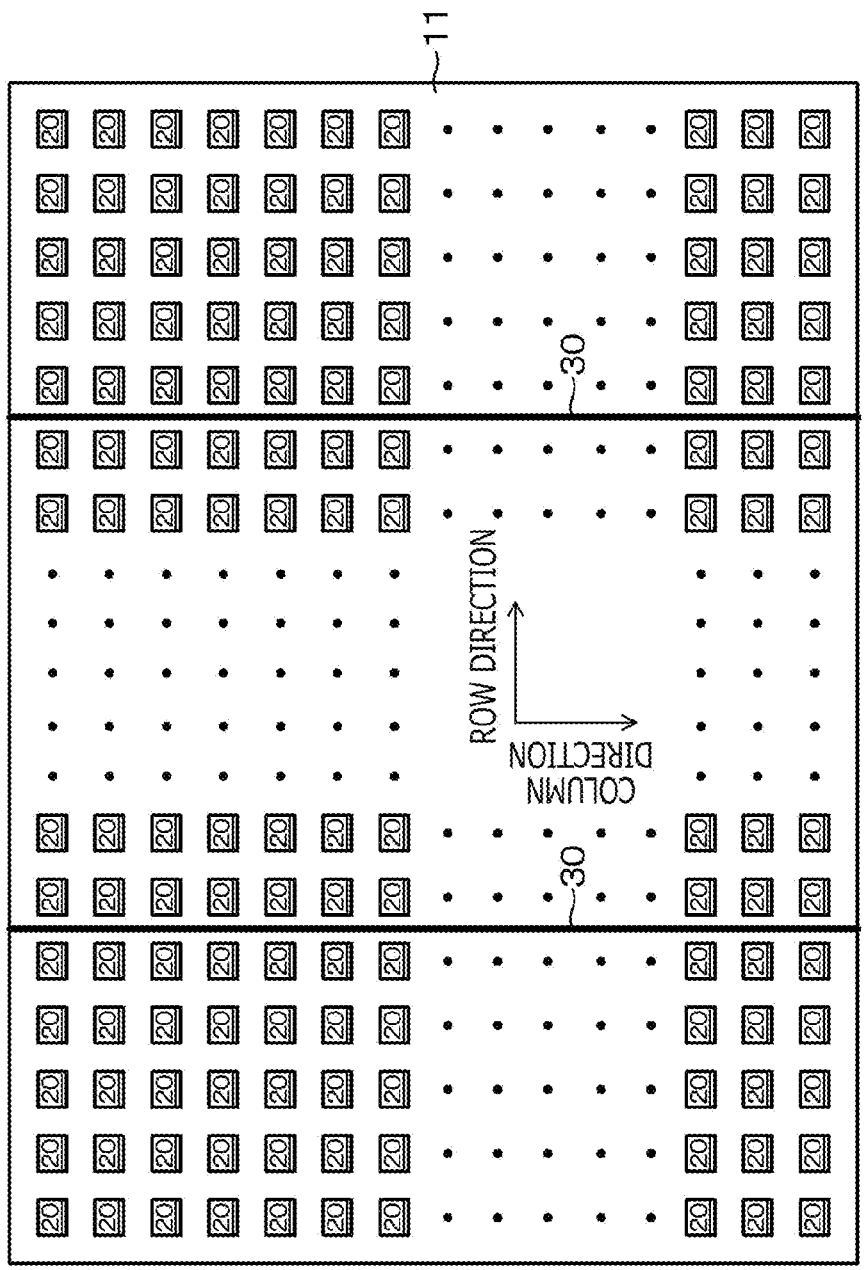
FIG. 3 is a diagram describing power lines disposed along a column direction of a pixel array section.

In the description given below, distinctive offset or noise in the captured image is assumed to be a singular point in the captured image. Then, a singular point in the captured image can be said to be noise produced by a noise generation source. Power lines 30 disposed in the column direction (i.e., in the direction along the pixel columns/vertical direction) in the pixel array section 11 as illustrated in FIG. 3 can be cited as an example of a noise generation source. Passage of a current through the power line 30 disposed in the pixel array section 11 produces line noise, i.e., streaking, in the row direction (i.e., in the direction along the pixel rows/horizontal direction) due to the current.

The power lines 30 that may generate noise are disposed one for each plurality of pixel columns of the pixel array section 11 along the column direction. Accordingly, the plurality of power lines 30 (e.g., several or more than ten power lines) is disposed along the column direction in the pixel array section 11. Then, the supply voltage $V_{DD}$ is divided and supplied, on a pixel-row-by-pixel-row basis, to each pixel 20 of the plurality of pixel columns belonging to each power line 30.

Figure 4A:
FIG. 4A is a diagram illustrating part of two power lines disposed within the pixel array section.
Figure 4B:
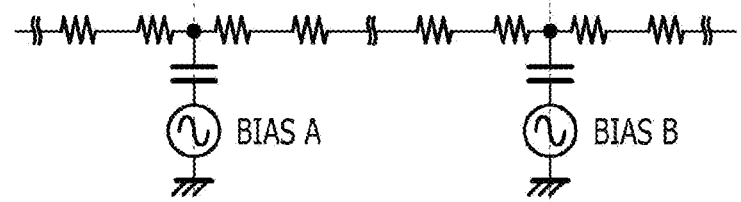
FIG. 4B is an equivalent circuit diagram of some pixel circuits belonging to a single pixel row.
Figure 4C:
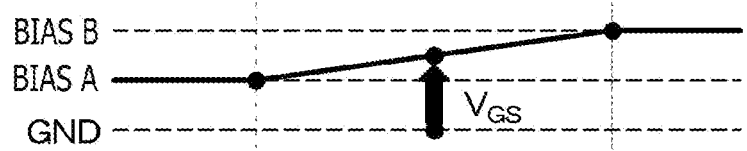
FIG. 4C is a diagram illustrating a change in a bias voltage of a pixel transistor between the two power lines in the case where a ground potential GND does not fluctuate.

A description will be given here of streaking that occurs due to a current flowing through the power line 30 with reference to FIGS. 4A, 4B and 4C. FIG. 4A is a diagram illustrating part of two power lines 30A and 30B disposed within the pixel array section 11. FIG. 4B is an equivalent circuit diagram of some pixel circuits belonging to a single pixel row.

Letting a bias voltage of the power line 30A on the left in FIG. 4A be denoted as a bias A and a bias voltage of the power line 30B on the right be denoted as a bias B, streaking does not occur if there is no potential difference between the power lines 30A and 30B (bias A=bias B).

Figure 4D:
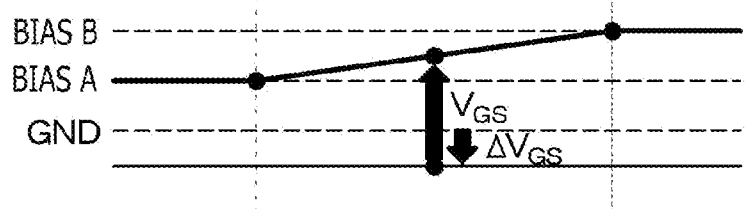
FIG. 4D is a diagram illustrating a change in a bias voltage of the pixel transistor between the two power lines in the case where a ground potential GND fluctuates.

However, in the case where there is a potential difference between the power lines 30A and 30B (=bias A−bias B), the potential difference is divided among resistors. As a result, as illustrated in FIG. 4C, the bias voltage of the pixel transistor changes in an inclined manner between the two power lines, i.e., the power lines 30A and 30B, thus causing streaking to occur. The bias voltage of the pixel transistor is a gate-to-source voltage $V_{GS}$ of the amplifying transistor 24 (refer to FIG. 2) of the pixel 20. FIG. 4D illustrates a change in the bias voltage of the pixel transistor in the case where the ground potential GND fluctuates. Then, streaking caused by this bias voltage difference is expected to manifest itself in the shape of an inclination between the two power lines, i.e., the power lines 30A and 30B.

Distinctive offset or noise in the captured image as described above, i.e., a singular point in the captured image, cannot be effectively suppressed by the correction process (refer, for example, to PTL 1) that detects a black level or noise level from light-shielded pixels and calculates a correction value by averaging between left and right, linear interpolation, or the like.

<Embodiment of the Present Disclosure>

In the embodiment of the present disclosure, a singular point in a captured image is assumed to be noise produced by a noise generation source, and the power lines 30 disposed in the pixel array section 11 are, for example, assumed to be noise generation sources. Then, distinctive offset or noise in the captured image such as noise produced by currents flowing through the power lines 30 can be effectively suppressed.

Figure 5:
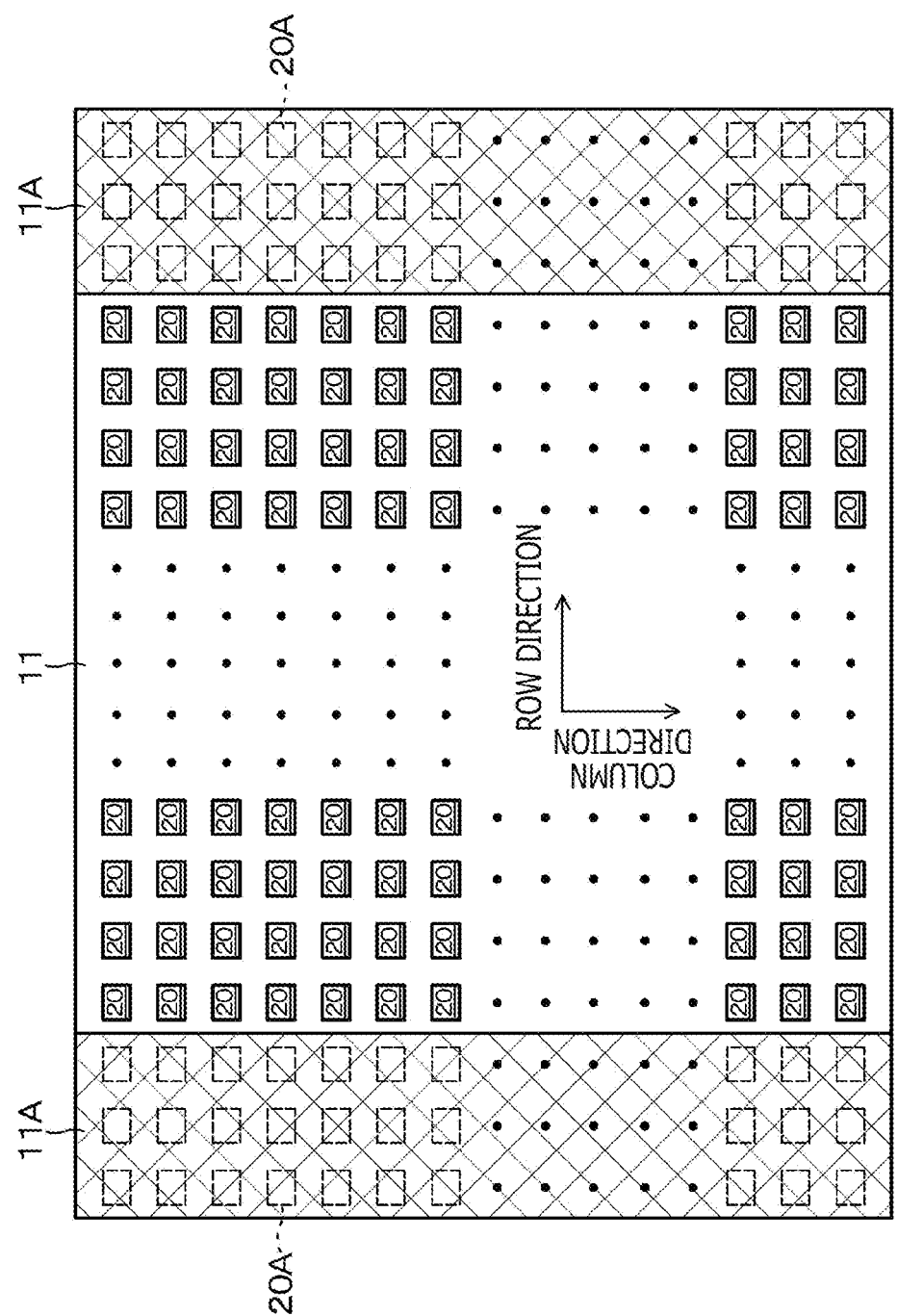
FIG. 5 is a diagram describing light-shielded portions and light-shielded pixels of the pixel array section.

Specifically, a correction signal is generated on the basis of signals of horizontal light-shielded pixels 20A of light-shielded portions 11A provided, for example, at horizontal edge portions of the pixel array section 11 as illustrated in FIG. 5, and a correction process is performed on each of the pixels 20 in an effective pixel region by using the correction signal. At this time, a captured image is divided into a plurality of regions relative to positions of singular points in the captured image such as the positions of noise produced by currents flowing through the power lines 30, noise generation sources. For example, the captured image is divided into a plurality of regions in the row direction (horizontally). Specifically, one pixel row's (line's) worth of image is divided into a plurality of regions. Then, a correction signal is generated for each divided region by using signals of the horizontal light-shielded pixels 20A, followed by a correction process by using the correction signal generated for each divided region.

At the time of division into a plurality of regions, the number of divided regions and a size of each region can be set in a desired manner. Specifically, the number of divided regions can be varied depending on the image size and the singular point to be corrected. Also, the size of the divided region can be changed from one region to another.

Incidentally, when the power lines 30 are noise generation sources, a potential difference causing streaking does not always occur, for example, between the power lines 30A and 30B in FIG. 4A, and there is a case where no potential difference occurs. This is an inherent feature of each imaging apparatus (CMOS image sensor 1 in the present embodiment). That is, whether or not noise occurs due to currents flowing through the power lines 30 varies depending on the imaging apparatus.

Accordingly, when a captured image is divided into a plurality of regions, it is necessary to acquire, in advance, noise position information, a reference for division into regions, i.e., feature point position information, for each imaging apparatus. Feature point position information is acquired in advance through verification, evaluation measurement, or the like prior to shipment of the imaging apparatus. Then, feature point position information acquired in advance is supplied to the streaking correction circuit 40 in the signal processing section 17 as information for dividing the captured image into a plurality of regions.

A description will be given below of specific Working Examples of the present embodiment for effectively suppressing distinctive offset or noise in a captured image.

Working Example 1

Figure 6:
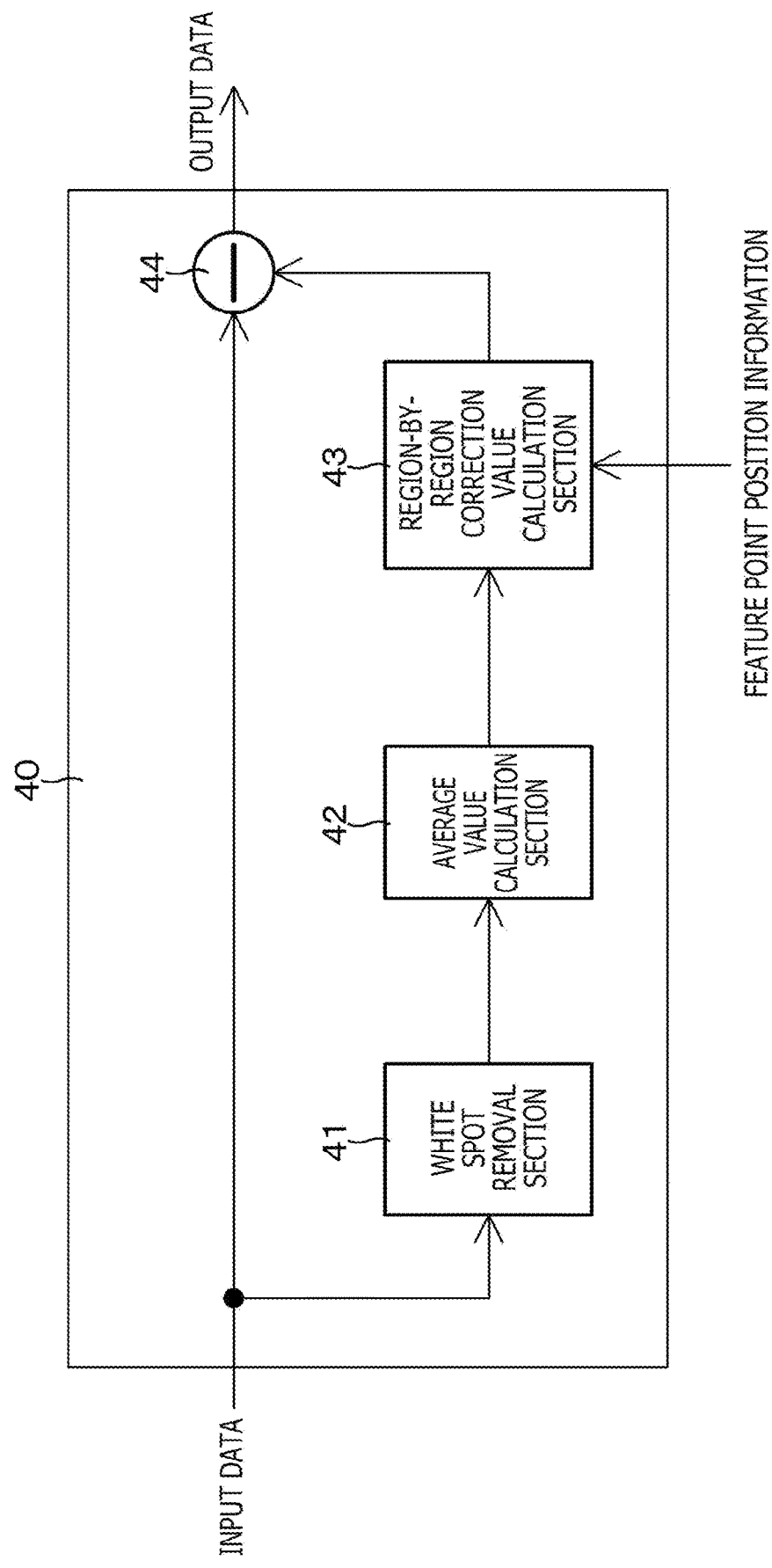
FIG. 6 is a block diagram illustrating an example of a circuit configuration of a streaking correction circuit according to Working Example 1.

Working Example 1 is a basic form of a streaking correction circuit for correcting streaking. FIG. 6 illustrates an example of a circuit configuration of the streaking correction circuit 40 according to Working Example 1.

As illustrated in FIG. 6, the streaking correction circuit 40 according to Working Example 1 includes a white spot removal section 41, an average value calculation section 42, a region-by-region correction value calculation section 43, and a subtraction section 44, and the streaking correction circuit 40 takes, as input data, captured image data that has gone through the sorting section 16 illustrated in FIG. 1.

The white spot removal section 41 performs a process of determining, as defective pixels (white spots), the horizontal light-shielded pixels 20A of input data whose luminance level exceeds a given optionally set threshold and excluding data of the defective pixels from the average value calculation handled by the average value calculation section 42 at the next stage. The average value calculation section 42 performs a process of calculating an average value of the pixel data that is free of defective pixel data after removal by the white spot removal section 41 by using, for example, a known median filter. The median filter performs a process of transforming a pixel of interest into a median of surrounding pixel concentrations.

In the present Working Example, the region-by-region correction value calculation section 43 performs, in the case where a captured image is divided into a plurality of regions, a process of calculating a region-by-region correction signal in the case of division of one line's (one pixel row's) worth of image into a plurality of regions on the basis of an average value calculated by the average value calculation section 42. The subtraction section 44 performs a process of correcting streaking by subtracting the region-by-region correction value calculated by the region-by-region correction value calculation section 43 from data of an effective pixel portion excluding the light-shielded portions 11A of the pixel array section 11.

In the streaking correction circuit 40 configured as described above, the white spot removal section 41, the average value calculation section 42, and the region-by-region correction value calculation section 43 are included in a correction signal generation section that generates a correction signal (hereinafter may be written as a "correction value") on the basis of signals of the horizontal light-shielded pixels 20A of the light-shielded portions 11A. Also, the subtraction section 44 is included in a correction process section that performs a correction process on signals of the pixels 20 in the effective pixel region (effective pixels) by using the correction signal generated by the correction signal generation section.

Working Example 2

Figure 7:
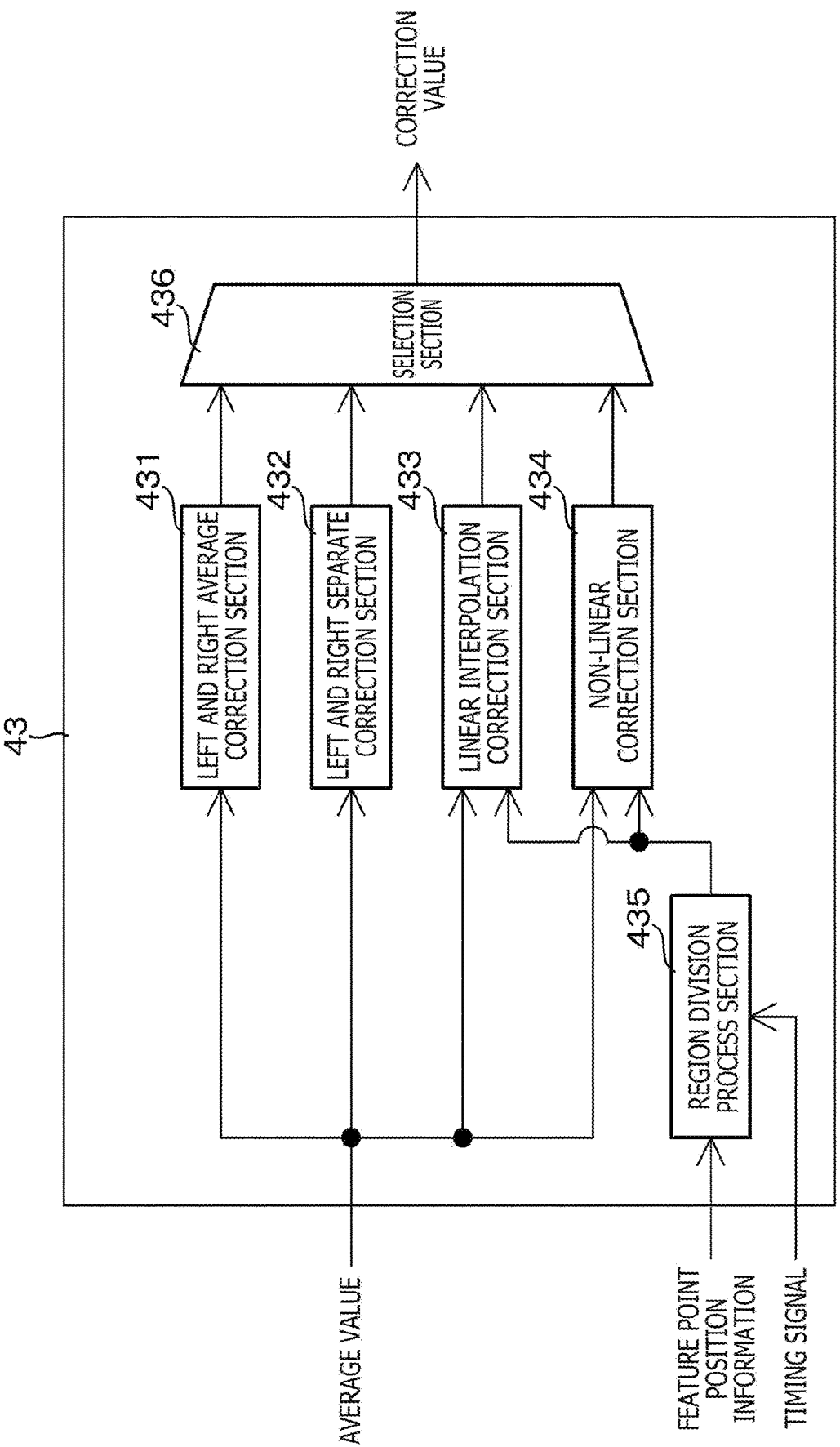
FIG. 7 is a block diagram illustrating an example of a specific configuration of a region-by-region correction value calculation section according to Working Example 2.

Working Example 2 is an example of a specific configuration of the region-by-region correction value calculation section 43 in the streaking correction circuit 40 according to Working Example 1. FIG. 7 illustrates an example of a specific configuration of the region-by-region correction value calculation section 43 according to Working Example 2.

The region-by-region correction value calculation section 43 includes a left and right average correction section 431, a left and right separate correction section 432, a linear interpolation correction section 433, a non-linear correction section 434, a region division process section 435, and a selection section 436. Then, the region-by-region correction value calculation section 43 can select, with the selection section 436, four types of correction processes, namely, left and right average correction, left and right separate correction, linear interpolation correction, and non-linear correction by using average values of signals (luminance level) of the horizontal light-shielded pixels 20A (refer to FIG. 5).

The left and right average correction section 431 calculates, for the horizontal light-shielded pixels 20A, an average value of the left and right light-shielded portions 11A (refer to FIG. 5) of the pixel array section 11 combined for use as a correction value. The left and right separate correction section 432 divides the effective pixel region horizontally (in the row direction) into two parts and assigns average values of the left and right light-shielded portions 11A to the respective regions for use as correction values.

The linear interpolation correction section 433 calculates, at the time of division of one line's (one pixel row's) worth of image into a plurality of regions, correction values from average values of the horizontal light-shielded pixels 20A of the respective left and right light-shielded portions 11A through linear interpolation of each of the divided regions. The region division process is carried out by the region division process section 435. The region division process section 435 divides one line's worth of image into a plurality of regions on the basis of a timing signal supplied from a system control section 10 illustrated in FIG. 1 and feature point position information acquired in advance. The division into regions by the region division process section 435 is carried out within signal processing. The region division process section 435 performs the region division process within signal processing and supplies information regarding each region (e.g., addresses) to the linear interpolation correction section 433 and the non-linear correction section 434.

The linear interpolation correction section 433 carries out two types of linear interpolation correction, namely, (a) equal division/correction value linear interpolation that divides one line's worth of image into a plurality of equal regions for linear interpolation of correction values and (b) unequal division/correction value linear interpolation that divides one line's worth of image unequally for linear interpolation of correction values.

(a) Case of Equal Division/Correction Value Linear Interpolation

Figure 8:
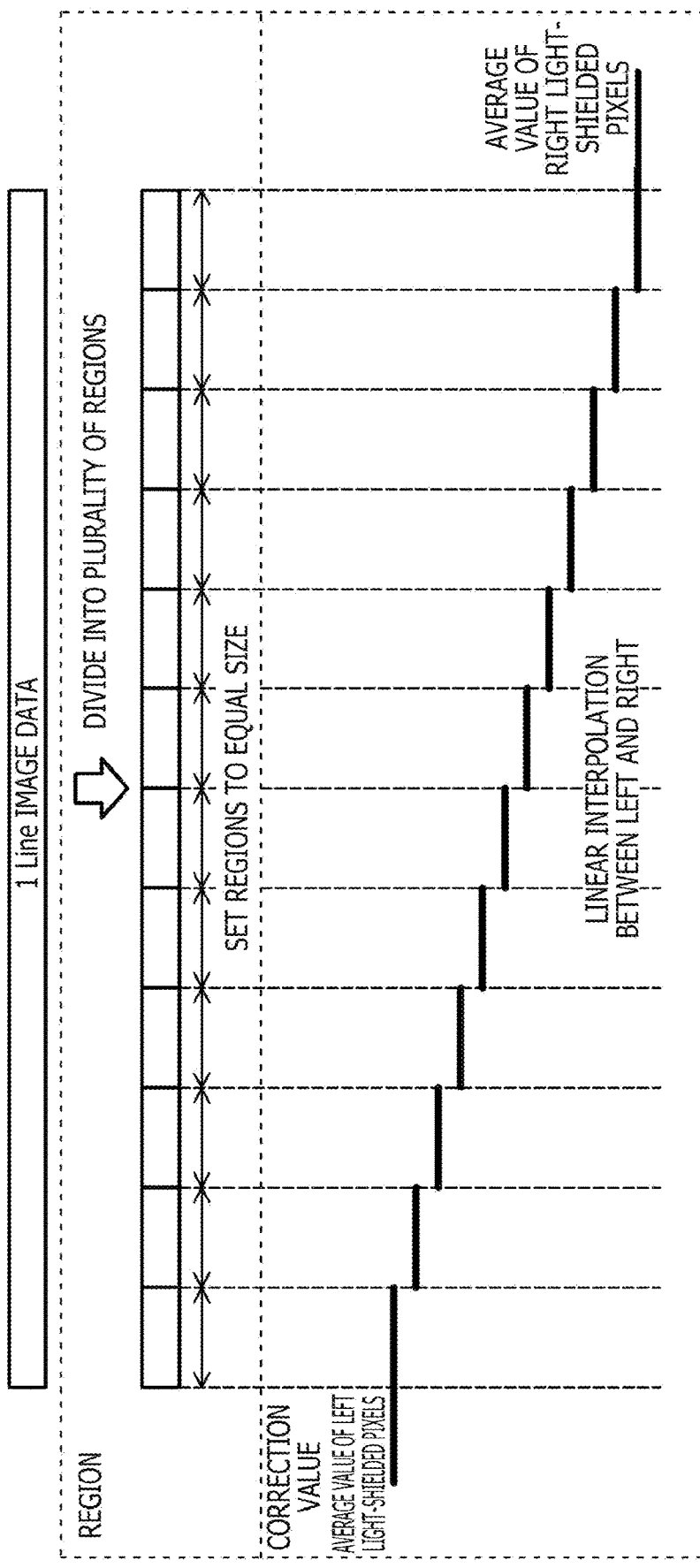
FIG. 8 is a conceptual diagram of a case where one line's worth of image is divided into a plurality of equal regions for calculation of correction values through linear interpolation.

FIG. 8 illustrates a conceptual diagram of a case where one line's worth of image is divided into a plurality of equal regions for calculation of correction values through linear interpolation. In the case of equal division/correction value linear interpolation, one line's worth of image is divided into a plurality of equally sized regions. Then, the difference between the average values of the horizontal light-shielded pixels 20A of the respective left and right light-shielded portions 11A (average value of the left light-shielded pixels/average value of the right light-shielded pixels) is divided evenly among the plurality of divided regions for calculation of correction values, followed by linear interpolation.

(b) Case of Unequal Division/Correction Value Linear Interpolation

Figure 9:
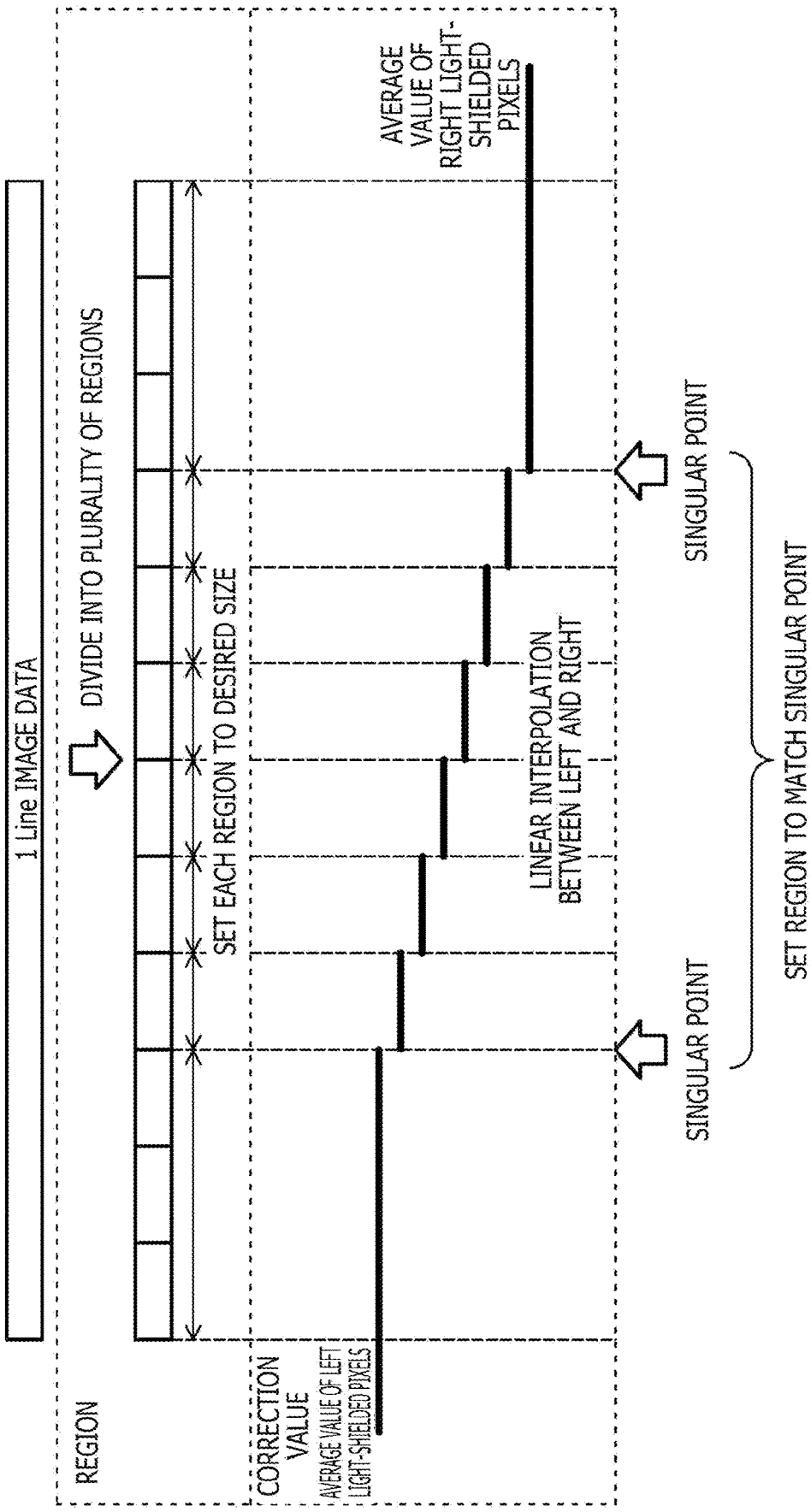
FIG. 9 is a conceptual diagram of a case where one line's worth of image is divided into a plurality of unequal regions for calculation of correction values through linear interpolation.

FIG. 9 illustrates a conceptual diagram of a case where one line's worth of image is divided into a plurality of unequal regions for calculation of correction values through linear interpolation. In the case of unequal division/correction value linear interpolation, one line's worth of image is divided into a plurality of regions of desired sizes relative to singular point positions in a captured image. Then, the region outside the plurality of divided regions is subjected to linear interpolation by using the average values of the horizontal light-shielded pixels 20A of the respective left and right light-shielded portions 11A (average value of the left light-shielded pixels/average value of the right light-shielded pixels) whereas the plurality of divided regions is subjected to linear interpolation by calculating correction values by dividing the difference between the average values of the left and right light-shielded pixels evenly.

As described above, it is possible to perform a correction process in a manner tailored to desired singular points in a captured image by dividing one line's worth of image into a plurality of regions relative to the singular point positions in the captured image and setting each region to a desired size. Here, streaking attributable to the potential difference between the plurality of power lines 30 can be corrected by assuming the singular point positions in the captured image to be, for example, the positions of the power lines 30, which are noise generation sources, and divide the image into regions relative to these positions.

In FIG. 7, the non-linear correction section 434 sets a desired correction value to each of the regions when one line's worth of image is divided into a plurality of regions of desired sizes as in the case of (b) unequal division/correction value linear interpolation by the linear interpolation correction section 433. That is, in contrast to unequal division/correction value linear interpolation by the linear interpolation correction section 433, the non-linear correction section 434 carries out unequal division/correction value non-linear interpolation that divides one line's worth of image into a plurality of regions of desired sizes relative to singular point positions and sets a non-linear correction value to each of the regions.

Figure 10:
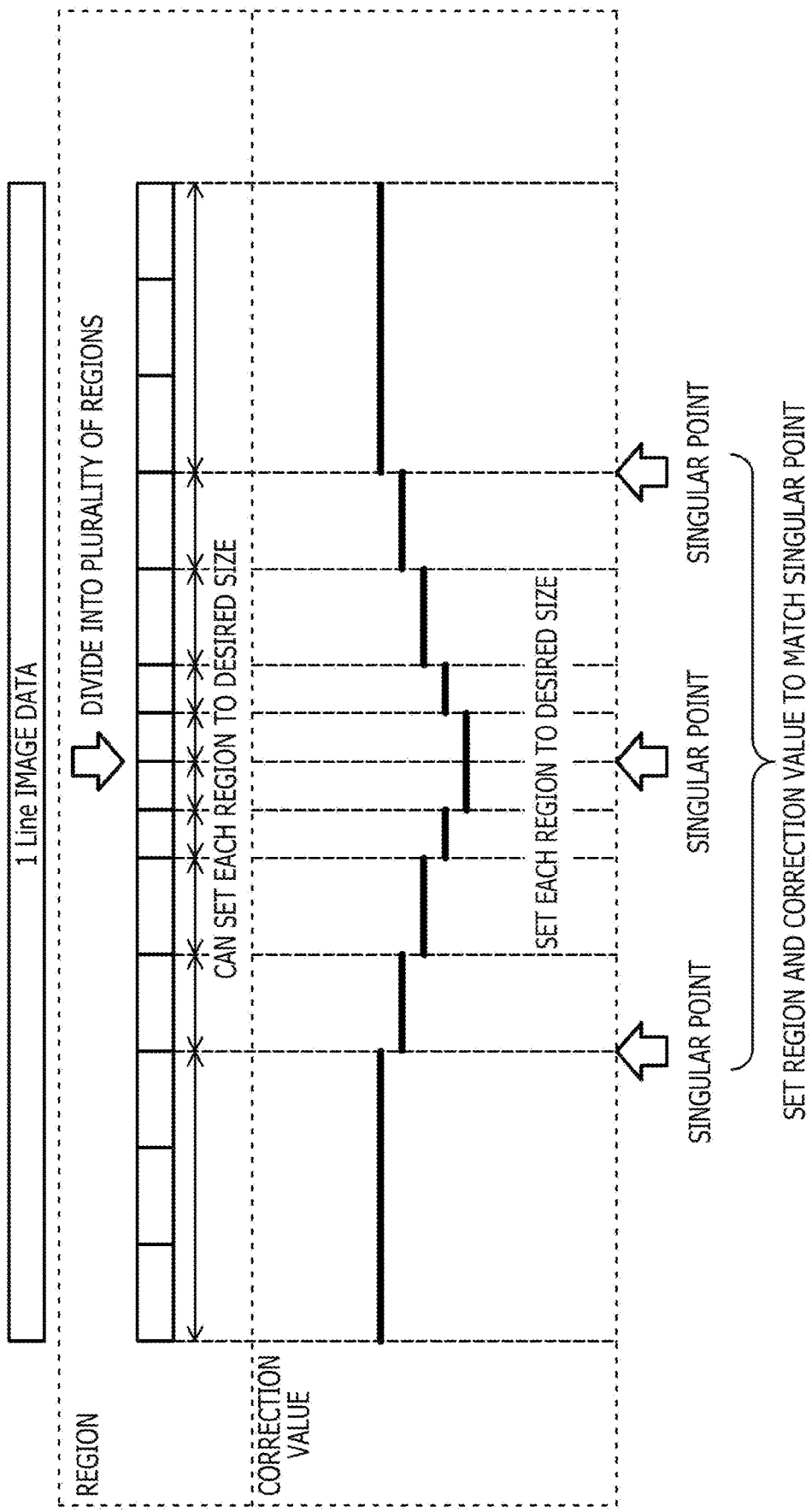
FIG. 10 is a conceptual diagram of a case where one line's worth of image is divided into a plurality of unequal regions for calculation of correction values through non-linear interpolation.

FIG. 10 illustrates a conceptual diagram of a case where one line's worth of image is divided into a plurality of unequal regions for calculation of correction values through non-linear interpolation. As opposed to unequal division/correction value linear interpolation, a desired correction value is set to each region, thus carrying out correction in a manner tailored to desired singular points in the captured image not confirmable from the average values of the horizontal light-shielded pixels 20A of the respective left and right light-shielded portions 11A (average value of the left light-shielded pixels/average value of the right light-shielded pixels).

Figure 11:
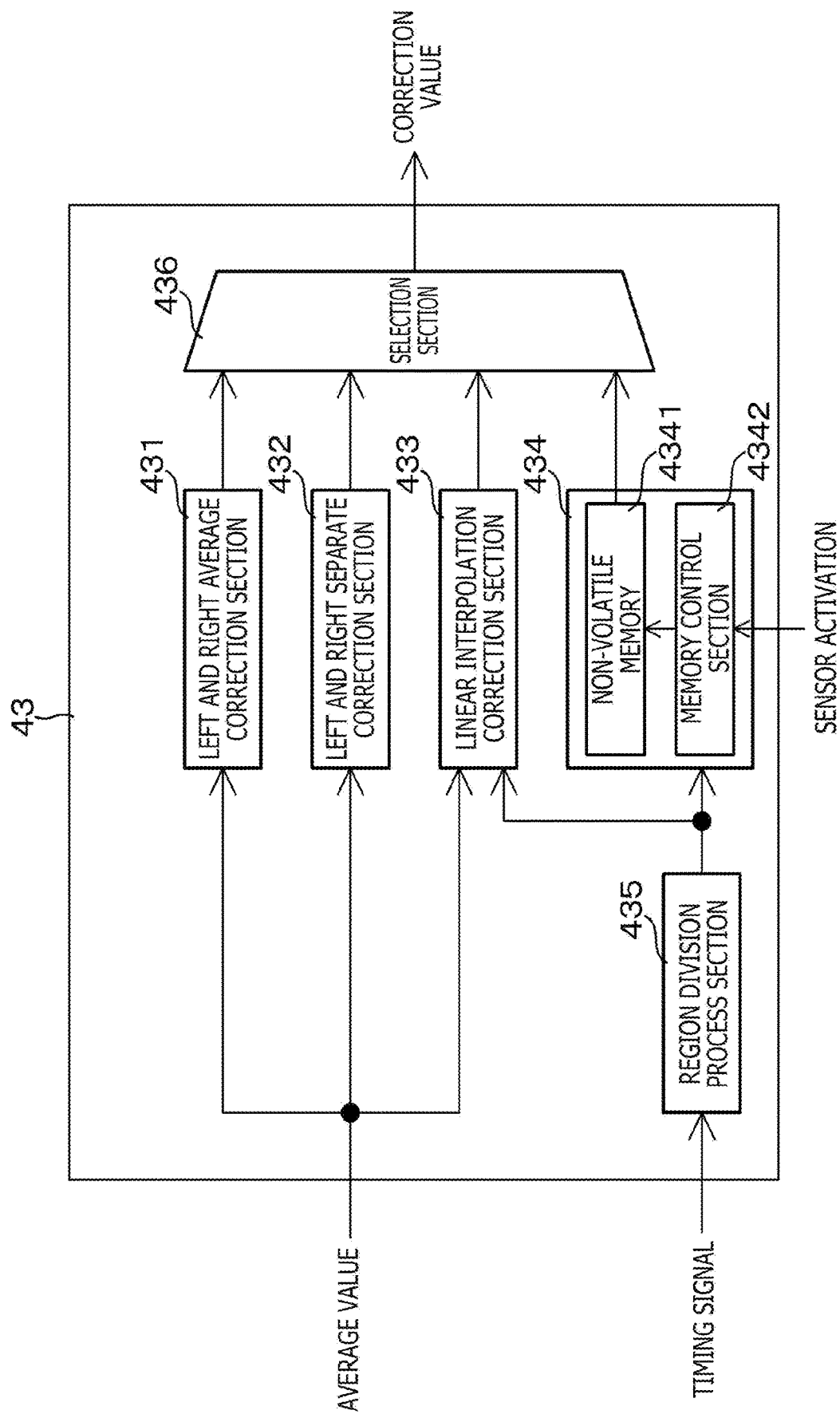
FIG. 11 is a block diagram illustrating an example of a specific configuration of a non-linear correction section that performs unequal division/correction value non-linear interpolation.

As for a desired correction value set for each region, an optimal correction value for an individual imaging apparatus is acquired in advance by deriving the value from an evaluation measurement result during verification, evaluation measurement, or the like prior to shipment of the imaging apparatus (CMOS image sensor 1 in the present embodiment). Specifically, as illustrated in FIG. 11, the non-linear correction section 434 includes a non-volatile memory 4341 and a memory control section 4342, and the imaging apparatus is shipped with an optimal correction value, acquired in advance through verification, evaluation measurement, or the like written in the non-volatile memory 4341. Then, when the sensor (imaging apparatus) is activated after the shipment, the optimal correction value for the individual imaging apparatus is read out from the non-volatile memory 4341 under control of the memory control section 4342 for use in the correction process. This makes it possible to carry out correction through unequal division/correction value non-linear interpolation in a manner tailored to variation between individual imaging apparatuses.

It should be noted that a correction value can also be switched from the non-volatile memory 4341 over to register setting, thus setting a correction value according to a desired mode or state. Also, in an imaging apparatus for reading out pixel signals that have been multiplied by a given gain, it is possible to adjust the correction value in conjunction with the gain.

Figure 12:
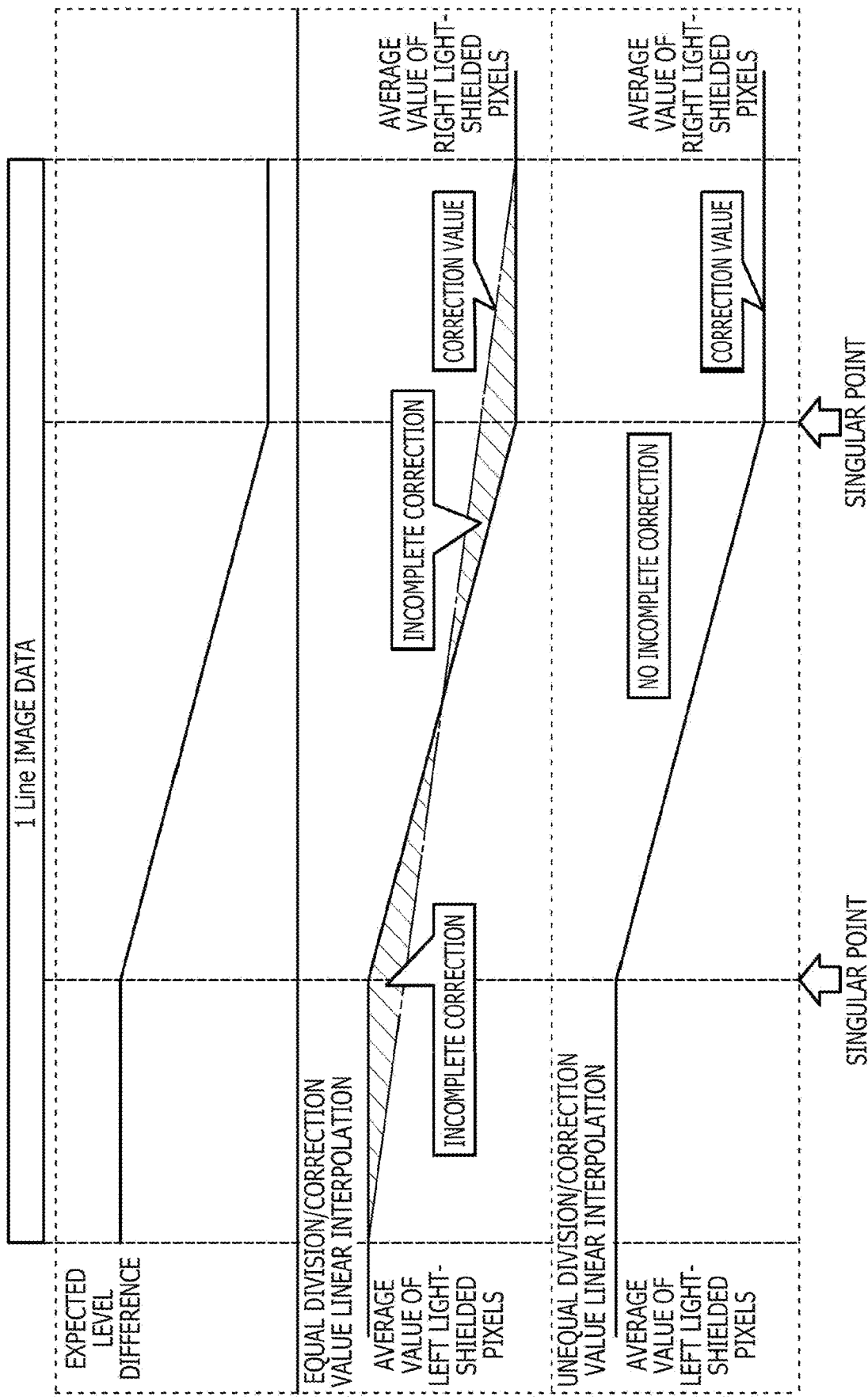
FIG. 12 is a diagram illustrating correction results of equal division/correction value linear interpolation and unequal division/correction value linear interpolation in Example 1 of an expected level difference.

FIG. 12 illustrates correction results of equal division/correction value linear interpolation and unequal division/correction value linear interpolation in Example 1 of expected level difference. Example 1 of expected level difference is an example of a case where there are two singular points in the captured image in a horizontally symmetrical manner as illustrated at the top in FIG. 12. In the case where a correction process according to equal division/correction value linear interpolation is performed in this Example 1 of expected level difference, it is impossible to effectively suppress noise at the singular points in the captured image, resulting in incomplete correction as illustrated in the middle in FIG. 12. In contrast, a correction process according to unequal division/correction value linear interpolation allows for linear interpolation tailored to level differences, effectively suppressing noise at the singular points in the captured image and ensuring freedom from incomplete correction as illustrated at the bottom in FIG. 12.

Figure 13:
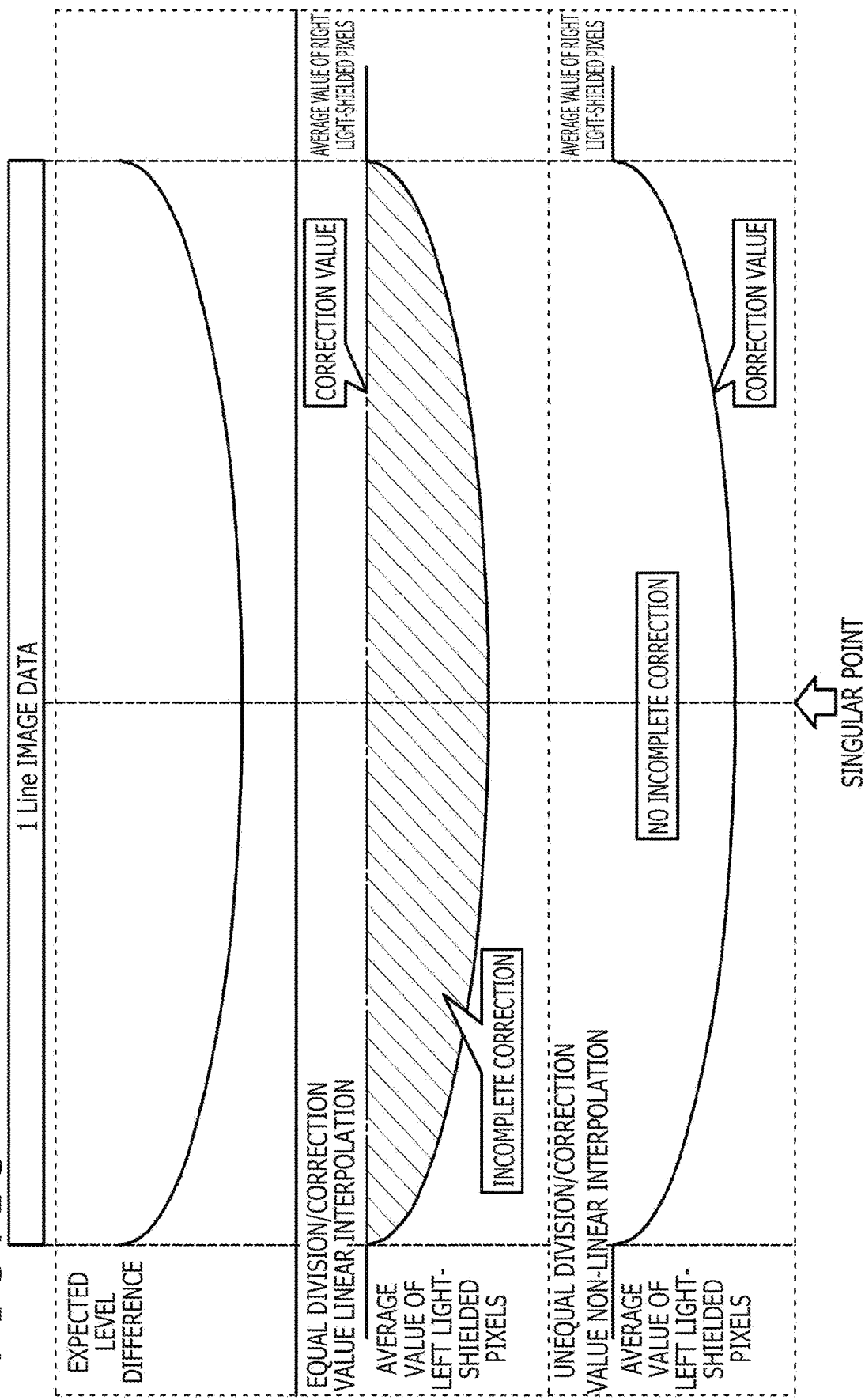
FIG. 13 is a diagram illustrating correction results of equal division/correction value linear interpolation and unequal division/correction value non-linear interpolation in Example 2 of an expected level difference.

FIG. 13 illustrates correction results of equal division/correction value linear interpolation and unequal division/correction value non-linear interpolation in Example 2 of expected level difference. Example 2 of expected level difference is an example of a case where there is a singular point at a center in the row direction (horizontal direction) in the captured image and where a level difference in a curved form manifests itself as illustrated at the top in FIG. 13. In the case where a correction process according to equal division/correction value linear interpolation is performed in Example 2 of expected level difference, it is impossible to effectively suppress noise at the singular point in the captured image, resulting in incomplete correction as illustrated in the middle in FIG. 13. In contrast, a correction process according to unequal division/correction value non-linear interpolation effectively suppresses noise at the singular point in the captured image and ensuring freedom from incomplete correction as illustrated at the bottom in FIG. 13.

Modification Example

Although described above on the basis of a preferred embodiment, the technique of the present disclosure is not limited to the embodiment. The configuration and structure of the imaging apparatus described in the above embodiment are illustrative and can be altered as appropriate.

For example, although the case is illustrated in the above embodiment where the power lines 30 disposed in the pixel array section 11 are noise generation sources and where noise produced by currents flowing through the power lines 30 turns into streaking, the technique of the present disclosure is not limited thereto. For example, when there is a circuit portion consuming significant power in part of the pixel array section 11, the circuit portion may turn into a noise generation source. That is, when there is a circuit portion consuming significant power in part of the pixel array section 11, noise may occur as a result of the flow of a significant current through the circuit portion, thus resulting in streaking.

Also, although, in the above embodiment, a captured image is divided into a plurality of regions in the row direction (horizontal direction), and specifically, one pixel row's worth of image is divided into a plurality of regions, the technique of the present disclosure is not limited to division into a plurality of regions in the row direction. It is possible to divide a captured image into a plurality of regions in the column direction (vertical direction), and specifically, to divide one pixel column's worth of image into a plurality of regions and calculate a correction value using signals of light-shielded pixels of light-shielded portions provided at upper and lower edge portions of the pixel array section 11 for correction. Also, it is possible to use division into regions in the row direction and division into regions in the column direction in combination.

Also, although, in the above embodiment, signals of the light-shielded pixels provided at the edge portions of the pixel array section 11 are used to calculate a correction value (correction signal), it is possible to discretely embed light-shielded pixels in the effective pixel region and use signals of the light-shielded pixels. In this case, correction value interpolation can be achieved in a manner tailored to an image level.

Application Example

Figure 14:
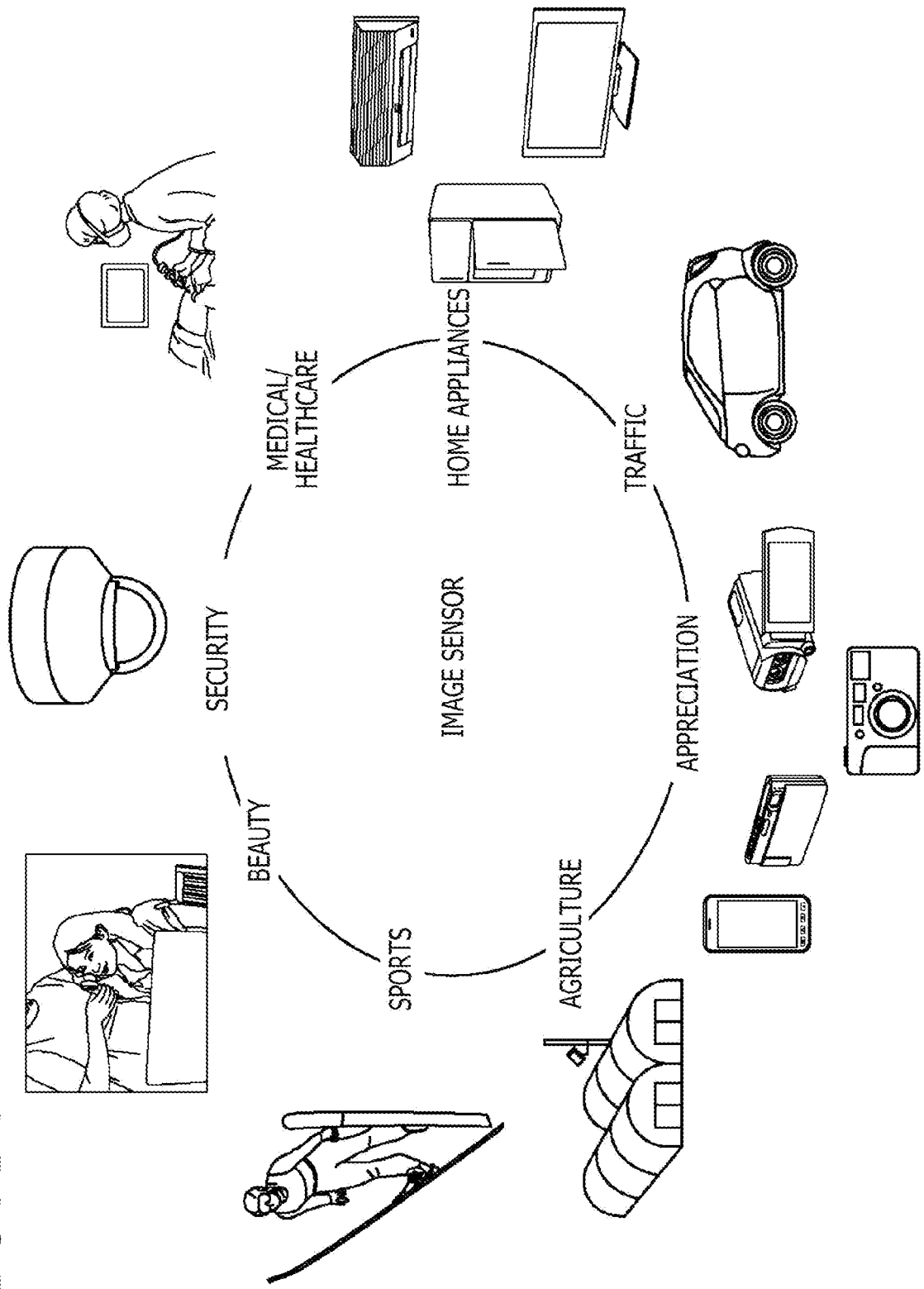
FIG. 14 is a diagram illustrating an application example of the technique of the present disclosure.

The imaging apparatus according to the present embodiment described above can find application in a variety of apparatuses that sense light such as visible light, infrared light, ultraviolet light, and X-ray, for example, as illustrated in FIG. 14. Specific examples of various apparatuses will be enumerated below.

Apparatuses for capturing images for appreciation such as a digital camera and mobile equipment having a camera function Apparatuses used in the sector of traffic such as a vehicle-mounted sensor for capturing images of the front, rear, surroundings, and inside of an automobile and the like for safe driving such as automatic stop and for recognition of a driver's condition and so on, a monitoring camera for monitoring traveling vehicles and roads, and a distance measurement sensor for measuring the distance between vehicles Apparatuses used in the sector of home appliances such as a TV receiver, a refrigerator, and an air-conditioner for capturing images of user's gestures and manipulating equipment according to such gestures Apparatuses used in the sector of medical treatment and healthcare such as an endoscope and an apparatus for capturing images of blood vessels by receiving infrared light Apparatuses used in the sector of security such as a monitoring camera for crime prevention, a camera for personal authentication, and the like Apparatuses used in the sector of beauty such as a skin measuring instrument for capturing images of skin, a microscope for capturing images of scalp, and the like Apparatuses used in the sector of sports such as an action camera and a wearable camera for sports use Apparatuses used in the sector of agriculture such as a camera for monitoring conditions of fields and crops <Electronic Equipment of the Present Disclosure>

The technique of the present disclosure is applicable to a variety of products. More specific examples of application examples will be described below. A description will be given here of cases where the technique of the present disclosure is applied to an imaging apparatus such as a digital still camera or a video camera, a mobile terminal apparatus having an imaging function such as a mobile phone, and a copier using a camera module for its image capture section.

[Camera Module]

Figure 15:
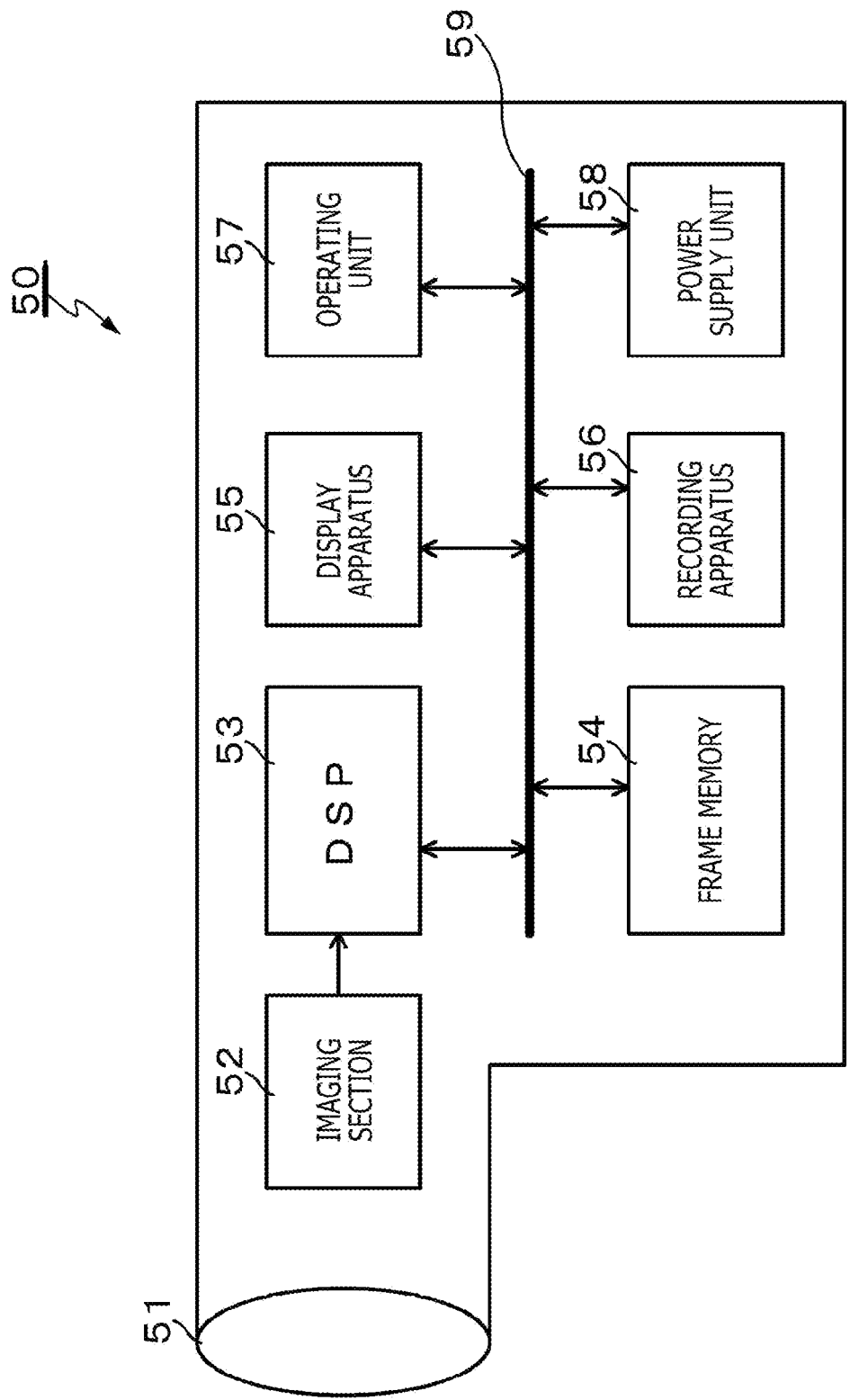
FIG. 15 is a block diagram illustrating a configuration example of a camera module such as a digital still camera or a video camera, an example of electronic equipment of the present disclosure.

FIG. 15 is a block diagram illustrating a configuration example of a camera module such as a digital still camera or a video camera, an example of electronic equipment of the present disclosure.

As illustrated in FIG. 15, a camera module 50 according to the present example has an imaging optics 51 including a group of lenses, an imaging section 52, a DSP circuit 53, a frame memory 54, a display apparatus 55, a recording apparatus 56, an operating unit 57, a power supply unit 58, and the like. Then, the DSP circuit 53, the frame memory 54, the display apparatus 55, the recording apparatus 56, the operating unit 57, and the power supply unit 58 are connected to each other via a bus line 59.

The imaging optics 51 captures incident light (image light) from a subject and forms an image on an imaging surface of the imaging section 52. The imaging section 52 converts an amount of incident light whose image has been formed on the imaging surface by the imaging optics 51 into an electric signal and outputs the signal as a pixel signal. The DSP circuit 53 performs common camera signal processing tasks such as white balancing, demosaicing, and gamma correction.

The frame memory 54 is used to store data as appropriate in the course of signal processing by the DSP circuit 53. The display apparatus 55 includes a panel display apparatus such as a liquid crystal display apparatus or an organic EL (electroluminescence) display apparatus and displays a video or still image captured by the imaging section 52. The recording apparatus 56 records a video or still image captured by the imaging section 52 in a recording medium such as a portable semiconductor memory, an optical disc, or an HDD (Hard Disk Drive).

The operating unit 57 issues operating instructions regarding a variety of functions of the present imaging apparatus 50. The power supply unit 58 supplies, as appropriate, various types of power to the DSP circuit 53, the frame memory 54, the display apparatus 55, the recording apparatus 56, and the operating unit 57 as operating power sources.

The camera module 50 configured as described above can be used as a camera module for not only a video camera and a digital still camera but also mobile equipment such as a smartphone and a mobile phone. Then, it is possible to provide high-quality captured images by using, as the imaging apparatus 52 of the camera module 50, the imaging apparatus according to the embodiment described above such as the one having a streaking correction circuit capable of effectively suppressing distinctive offset or noise in an image capture screen.

<Possible Configurations of the Present Disclosure>

It should be noted that the present disclosure can also have the following configurations.

«A. Streaking Correction Circuit»

[A-1]

A streaking correction circuit including:
a correction signal generation section adapted to generate a correction signal on the basis of signals of light-shielded pixels of light-shielded portions provided at edge portions of a pixel array section having pixels, each including a light reception section, arranged in a matrix pattern; and
a correction process section adapted to perform a correction process on signals of effective pixels of the pixel array section by using the correction signal generated by the correction signal generation section, in which
the correction signal generation section divides a captured image into a plurality of regions relative to a position of a singular point in the captured image and generates a correction signal for each divided region by using the signals of the light-shielded pixels, and
the correction process section performs the correction process by using the correction signal generated for each divided region.

[A-2]

The streaking correction circuit of [A-1], in which the singular point in the captured image includes noise produced by a noise generation source.

[A-3]

The streaking correction circuit of [A-2], in which the noise generation source includes a power line disposed in the pixel array section.

[A-4]

The streaking correction circuit of any one of [A-1] to [A-3], in which
the correction signal generation section calculates, of the light-shielded pixels of the light-shielded portions, an average value of light-shielded pixel data excluding defective pixel data with a luminance level in excess of a given threshold and generates a correction signal from the calculated average value.

[A-5]

The streaking correction circuit of [A-4], in which
the correction signal generation section calculates an average value of light-shielded pixel data excluding defective pixel data by using a median filter.

[A-6]

The streaking correction circuit of any one of [A-1] to [A-5], in which
the number of divided regions and a size of each region can be set in a desired manner at a time of division into a plurality of regions.

«B. Imaging Apparatus»

[B-1]

An imaging apparatus including:
a pixel array section having pixels, each including a light reception section, arranged in a matrix pattern and light-shielded portions at edge portions; and
a streaking correction circuit adapted to correct streaking of signals of effective pixels of the pixel array section, in which
the streaking correction circuit includes
a correction signal generation section adapted to generate a correction signal on the basis of signals of light-shielded pixels of the light-shielded portions, and a correction process section adapted to perform a correction process on the signals of the effective pixels of the pixel array section by using the correction signal generated by the correction signal generation section, the correction signal generation section divides a captured image into a plurality of regions relative to a position of a singular point in the captured image and generates a correction signal for each divided region by using the signals of the light-shielded pixels, and the correction process section performs the correction process by using the correction signal generated for each divided region.

[B-2]

The imaging apparatus of [B-1], in which the singular point in the captured image includes noise produced by a noise generation source.

[B-3]

The imaging apparatus of [B-2], in which the noise generation source includes a power line disposed in the pixel array section.

[B-4]

The imaging apparatus of any one of [B-1] to [B-3], in which the correction signal generation section calculates, of the light-shielded pixels of the light-shielded portions, an average value of light-shielded pixel data excluding defective pixel data with a luminance level in excess of a given threshold and generates a correction signal from the calculated average value.

[B-5]

The imaging apparatus of [B-4], in which the correction signal generation section calculates an average value of light-shielded pixel data excluding defective pixel data by using a median filter.

[B-6]

The imaging apparatus of any one of [B-1] to [B-5], in which the number of divided regions and a size of each region can be set in a desired manner at a time of division into a plurality of regions.

[B-7]

The imaging apparatus of any one of [B-1] to [B-6], in which the correction signal generation section has a non-volatile memory to which a correction signal acquired in advance is written, and at a time of activation of the imaging apparatus, the correction signal generation section reads out the correction signal from the non-volatile memory for use in the correction process by the correction process section.

[B-8]

The imaging apparatus of [B-7], in which the correction signal written to the non-volatile memory is derived from an evaluation measurement result prior to shipment of the imaging apparatus.

«C. Electronic Equipment»

[C-1]

Electronic equipment including:

an imaging apparatus including a pixel array section having pixels, each including a light reception section, arranged in a matrix pattern and light-shielded portions at edge portions, and a streaking correction circuit adapted to correct streaking of signals of effective pixels of the pixel array section, in which the streaking correction circuit includes a correction signal generation section adapted to generate a correction signal on the basis of signals of light-shielded pixels of the light-shielded portions, and a correction process section adapted to perform a correction process on the signals of the effective pixels of the pixel array section by using the correction signal generated by the correction signal generation section, the correction signal generation section divides a captured image into a plurality of regions relative to a position of a singular point in the captured image and generates a correction signal for each divided region by using the signals of the light-shielded pixels, and the correction process section performs the correction process by using the correction signal generated for each divided region.

[C-2]

The electronic equipment of [C-1], in which the singular point in the captured image includes noise produced by a noise generation source.

[C-3]

The electronic equipment of [C-2], in which the noise generation source includes a power line disposed in the pixel array section.

[C-4]

The electronic equipment of any one of [C-1] to [C-3], in which the correction signal generation section calculates, of the light-shielded pixels of the light-shielded portions, an average value of light-shielded pixel data excluding defective pixel data with a luminance level in excess of a given threshold and generates a correction signal from the calculated average value.

[C-5]

The electronic equipment of [C-4], in which the correction signal generation section calculates an average value of light-shielded pixel data excluding defective pixel data by using a median filter.

[C-6]

The electronic equipment of any one of [C-1] to [C-5], in which the number of divided regions and a size of each region can be set in a desired manner at a time of division into a plurality of regions.

REFERENCE SIGNS LIST

1 . . . CMOS image sensor, 10 . . . System control section, 11 . . . Pixel array section, 11A . . . Light-shielded portions, 12 . . . Row selection section, 13 . . . Constant current source section, 14 . . . Analog-digital conversion section, 15 . . . Horizontal transfer scanning section, 16 . . . Sorting section, 17 . . . Signal processing section, 18 . . . Cutout section, 19 . . . Output I/F (interface) section, 20 . . . Pixel, 20A . . . Light-shielded pixel, 21 . . . Photodiode (photoelectric conversion section), 22 . . . Transfer transistor, 23 . . . Reset transistor, 24 . . . Amplifying transistor, 25 . . . Selection transistor, 30, 30A, 30B . . . Power lines, 31 (311 to 31m) . . . Pixel drive lines, 32 (321 to 32n) Vertical signal lines, 40 . . . Streaking correction circuit, 41 . . . White spot removal section, 42 . . . Average value calculation section, 43 . . . Region-by-region correction value calculation section, 44 . . . Subtraction section

The invention claimed is:
1. A streaking correction circuit, comprising:
circuitry configured to:
  receive a timing signal;
  acquire feature point position information for an imaging apparatus, wherein the feature point position information corresponds to a reference to divide a captured image of the imaging apparatus into a plurality of regions;
  generate a correction signal based on signals of light-shielded pixels of light-shielded portions, wherein
    the light-shielded portions are at edge portions of a pixel array section that comprises a plurality of pixels in a matrix pattern,
    the plurality of pixels comprises the light-shielded pixels and effective pixels, and
    each of the plurality of pixels includes a light reception section;
  perform a correction process on signals of the effective pixels of the pixel array section based on the correction signal;
  divide the captured image into the plurality of regions relative to a position of a singular point in the captured image, wherein
    the position of the singular point corresponds to a position of a noise generation source, and
    the division of the captured image is based on the timing signal and the feature point position information; and
  generate a respective correction signal for each of the plurality of regions based on the signals of the light-shielded pixels; and
  perform the correction process based on the respective correction signal generated for each of the plurality of regions.

2. The streaking correction circuit of claim 1, wherein the noise generation source includes a power line in the pixel array section.

3. The streaking correction circuit of claim 1, wherein the circuitry is further configured to:
  calculate, of the light-shielded pixels of the light-shielded portions, an average value of light-shielded pixel data excluding defective pixel data with a luminance level in excess of a given threshold; and
  generate the correction signal from the calculated average value.

4. The streaking correction circuit of claim 3, wherein the circuitry is further configured to calculate the average value of the light-shielded pixel data excluding the defective pixel data based on a median filter.

5. The streaking correction circuit of claim 1, wherein a count of the plurality of regions is based on a size of the captured image.

6. An imaging apparatus, comprising:
  a pixel array section that comprises:
    a plurality of pixels in a matrix pattern, wherein
      the plurality of pixels comprises light-shielded pixels and effective pixels, and
      each of the plurality of pixels includes a light reception section; and
    light-shielded portions at edge portions of the pixel array section, wherein the light-shielded pixels correspond to the light-shielded portions; and
  a streaking correction circuit configured to correct streaking of signals of the effective pixels of the pixel array section, wherein the streaking correction circuit includes circuitry configured to:
    receive a timing signal;
    acquire feature point position information for the imaging apparatus, wherein the feature point position information corresponds to a reference to divide a captured image of the imaging apparatus into a plurality of regions;
    generate a first correction signal based on signals of the light-shielded pixels of the light-shielded portions;
    perform a correction process on the signals of the effective pixels based on the first correction signal;
    divide the captured image into the plurality of regions relative to a position of a singular point in the captured image, wherein
      the position of the singular point corresponds to a position of a noise generation source, and
      the division of the captured image is based on the timing signal and the feature point position information;
    generate a respective correction signal for each of the plurality of regions based on the signals of the light-shielded pixels; and
    perform the correction process based on the respective correction signal generated for each of the plurality of regions.

7. The imaging apparatus of claim 6, wherein
the circuitry comprises a non-volatile memory to which a second correction signal acquired in advance is written, and
at a time of activation of the imaging apparatus, the circuitry is further configured to read out the second correction signal from the non-volatile memory for use in the correction process.

8. The imaging apparatus of claim 7, wherein the circuitry is further configured to derive the second correction signal from an evaluation measurement result.

9. An electronic equipment, comprising:
  an imaging apparatus including:
    a pixel array section that comprises:
      a plurality of pixels in a matrix pattern, wherein the plurality of pixels comprises light-shielded pixels and effective pixels and each of the plurality of pixels includes a light reception section; and
      light-shielded portions at edge portions of the pixel array section, wherein the light-shielded pixels correspond to the light-shielded portions; and
    a streaking correction circuit configured to correct streaking of signals of the effective pixels of the pixel array section, wherein the streaking correction circuit includes circuitry configured to:
      receive a timing signal;
      acquire feature point position information for the imaging apparatus, wherein the feature point position information corresponds to a reference to divide a captured image of the imaging apparatus into a plurality of regions;
      generate a correction signal based on signals of the light-shielded pixels of the light-shielded portions;
      perform a correction process on the signals of the effective pixels based on the correction signal;
      divide the captured image into the plurality of regions relative to a position of a singular point in the captured image, wherein
        the position of the singular point corresponds to a position of a noise generation source, and
        the division of the captured image is based on the timing signal and the feature point position information; and generate a respective correction signal for each of the plurality of regions based on the signals of the light-shielded pixels; and perform the correction process based on the respective correction signal generated for each of the plurality of regions.

10. The streaking correction circuit according to claim 1, wherein the circuitry is further configured to perform the correction process by subtraction of the respective correction signal from data of an effective pixel portion, and the effective pixel portion excludes the light-shielded portions of the pixel array section.

* * * * *